(12) United States Patent
Payson et al.

(10) Patent No.: US 8,665,372 B2
(45) Date of Patent: Mar. 4, 2014

(54) METHOD AND SYSTEM FOR KEY AWARE SCALING

(75) Inventors: Christopher Payson, Bolton, MA (US); Timothy Hellman, Concord, MA (US); Ashish Koul, Cambridge, MA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/614,268

(22) Filed: Sep. 13, 2012

(65) Prior Publication Data
US 2013/0010196 A1      Jan. 10, 2013

Related U.S. Application Data

(63) Continuation of application No. 12/858,068, filed on Aug. 17, 2010, now Pat. No. 8,294,822.

(51) Int. Cl.
*H04N 5/14*        (2006.01)
*H04N 9/74*        (2006.01)

(52) U.S. Cl.
USPC .......................................... 348/571; 348/590

(58) Field of Classification Search
USPC ................. 348/571, 587, 585, 590–595, 597, 348/615–617; 345/660, 667, 670, 671, 472, 345/472.1, 472.2; 382/298–300
IPC ...................... H04N 5/14,9/64, 9/74, 9/75, 5/21
See application file for complete search history.

(56) References Cited

U.S. PATENT DOCUMENTS

| | | | |
|---|---|---|---|
| 5,719,640 A * | 2/1998 | Gehrmann | ..................... 348/587 |
| 6,023,302 A | 2/2000 | MacInnis et al. | |
| 6,122,014 A | 9/2000 | Panusopone et al. | |
| 6,549,643 B1 | 4/2003 | Toklu et al. | |
| 6,833,845 B2 * | 12/2004 | Kitagawa et al. | ............. 348/597 |

* cited by examiner

*Primary Examiner* — Sherrie Hsia
(74) *Attorney, Agent, or Firm* — Brinks Gilson & Lione

(57) ABSTRACT

A video processing device can determine whether an input pixel includes a keyed video parameter prior to filtering the input pixel. A non-keyed substitute pixel can be generated for the input pixel that includes the keyed video parameter. The non-keyed substitute pixel can be filtered if the input pixel included the keyed video parameter, otherwise the input pixel can be filtered.

19 Claims, 8 Drawing Sheets

METHOD AND SYSTEM FOR KEY AWARE SCALING

CROSS-REFERENCE TO RELATED APPLICATIONS/INCORPORATION BY REFERENCE

This patent application is a continuation a U.S. patent application Ser. No. 12/858,068, filed Aug. 17, 2010, entitled "Method and System for Key Aware Scaling," the contents of which are hereby incorporated herein by reference in their entirety.

FIELD

Certain embodiments of the systems and methods relate to video processing. More specifically, certain embodiments of the systems and methods relate to a method and system for key aware scaling.

BACKGROUND

While older display devices, such as conventional analog television sets, may only display information for a single channel at a time, more advanced display devices, however, allow for multiple-window display capability. That is, the display device may concurrently display information corresponding to multiple sources on the screen. For example, a television set may allow displaying multiple channels on screen at the same time. In this manner, a viewer may possess the capability to watch a first channel while still able to see the contents of a second channel. The multiple sources may correspond to multiple channels in the same broadcast, multiple channels in different broadcasts, and/or may correspond to multiple sub-streams within a single stream, such as in a multimedia stream read from Blu-ray or DVD discs. Processing multiple sources may be performed within the display device itself, and/or in other auxiliary devices such as dedicated players, and/or using set-top boxes.

Further limitations and disadvantages of conventional and traditional approaches will become apparent to one of skill in the art, through comparison of such systems with some aspects of the present systems and methods as set forth in the remainder of the present application with reference to the drawings.

BRIEF DESCRIPTION

DETAILED DESCRIPTION

Certain embodiments of the systems and methods may be found in a method and system for key aware scaling. In various embodiments of the systems and methods, a video processing device may be utilized to process video input that comprises a plurality of streams, wherein images corresponding to at least some of the plurality of streams may be displayed concurrently. In this regard, one or more of the video streams whose images may be displayed concurrently may comprise keyed video parameters, and the processing performed by the video processing device may be configured and/or performed as keying-aware processing. The keyed video parameters may comprise keyed luma and/or keyed chroma parameters. The keying-aware processing may comprise luma and/or chroma keying-aware scaling. The video processing device may determine, prior to processing of a pixel in one of the plurality of streams whether the pixel comprises keyed video parameters. In instances where the pixel is determined to comprise at least one keyed parameter, one or more other pixels may be selected, and a substitute video parameter corresponding to the at least one keyed video parameter of the pixel may be generated based on the selected one or more other pixels. In this regard, the generated video parameter may be utilized instead of the at least one keyed video parameter during the processing of the pixel. At least a portion of the one or more other pixels may be visible pixels, wherein the visible pixels comprise non-keyed video parameters corresponding to the at least one keyed parameter. The pixels used in generating the substitute video parameter may be selected based on nearest neighbor selection criteria. The generated substitute video parameter may be used as a filtering input during said keying-aware scaling. Outputs of the processing of the pixel may be post-processed, by clamping at least one of the video parameters.

Figure 1:
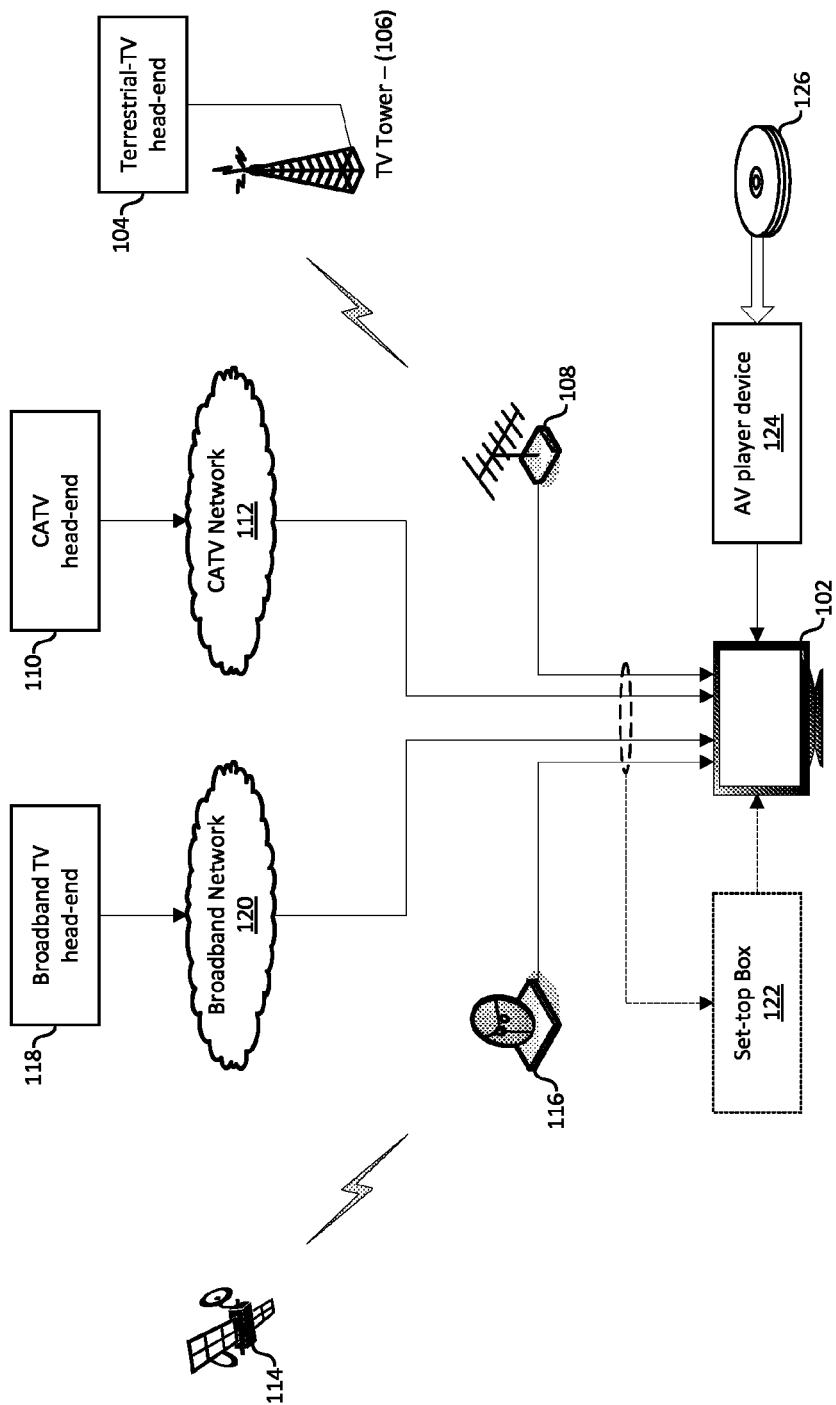
FIG. 1 is a block diagram illustrating an exemplary video system that supports playback of TV broadcasts and/or local feeds.

FIG. 1 is a block diagram illustrating an exemplary video system that supports playback of TV broadcasts and/or local feeds, which may be utilized in accordance with an embodiment of the systems and methods. Referring to FIG. 1, there is shown a media system 100, which may comprise a display device 102, a terrestrial-TV head-end 104, a TV tower 106, a TV antenna 108, a cable-TV (CATV) head-end 110, a cable-TV (CATV) distribution network 112, a satellite-TV head-end 114, a satellite-TV receiver 116, a broadband-TV head-end 118, a broadband network 120, a set-top box 122, and an audio-visual (AV) player device 124.

The display device 102 may comprise suitable logic, circuitry, interfaces and/or code for playing multimedia streams, which may comprise audio-visual (AV) data. The display device 102 may comprise, for example, a television, a monitor, and/or other display and/or audio playback devices, and/or components that may be operable to playback video streams and/or corresponding audio data, which may be received, directly by the display device 102 and/or indirectly via intermediate devices, such as the set-top box 122, and/or may be inputted from local media recording/playing devices and/or storage resources, such as the AV player device 124.

The terrestrial-TV head-end 104 may comprise suitable logic, circuitry, interfaces and/or code that may enable over-the-air broadcast of TV signals, via one or more of TV towers 106. The terrestrial-TV head-end 104 may broadcast analog and/or digital TV signals. The TV antenna 108 may comprise suitable logic, circuitry, interfaces and/or code that may enable reception of TV signals transmitted by the terrestrial- TV head-end 104, via the TV towers 106. The CATV head-end 110 may comprise suitable logic, circuitry, interfaces and/or code that may enable communication of cable-TV signals. The CATV head-end 110 may broadcast analog and/or digital formatted cable-TV signals. The CATV distribution network 112 may comprise suitable distribution systems that may enable forwarding of communication from the CATV head-end 110 to a plurality of cable-TV consumers. For example, the CATV distribution network 112 may comprise a network of fiber optics and/or coaxial cables that enable connectivity between one or more instances of the CATV head-end 110 and the display device 102.

The satellite-TV head-end 114 may comprise suitable logic, circuitry, interfaces and/or code that may enable down link communication of satellite-TV signals to terrestrial recipients. The satellite-TV head-end 114 may comprise, for example, one of a plurality of orbiting satellite nodes in a satellite-TV system. The satellite-TV receiver 116 may comprise suitable logic, circuitry, interfaces and/or code that may enable reception of downlink satellite-TV signals transmitted by the satellite-TV head-end 114. For example, the satellite receiver 116 may comprise a dedicated parabolic antenna operable to receive satellite television signals communicated from satellite television head-ends. Furthermore, because most satellite-TV downlink feeds may be securely encoded and/or scrambled, the satellite-TV receiver 116 may also comprise suitable logic, circuitry, interfaces and/or code that may enable decoding, descrambling, and/or deciphering of received satellite-TV feeds. This function may also be performed in a different entity, such as the STB 122.

The broadband-TV head-end 118 may comprise suitable logic, circuitry, interfaces and/or code that may enable TV and/or multimedia broadcasts, via the broadband network 120 for example. The broadband network 120 may comprise a system of interconnected networks, which enables exchange of information and/or data among a plurality of nodes, based on one or more networking standards, including, for example, TCP/IP. The broadband network 120 may comprise a plurality of broadband capable sub-networks, which may include, for example, satellite networks, cable networks, DVB networks, the Internet, and/or similar local or wide area networks, that collectively enable conveying data that may comprise multimedia content to plurality of end users. Connectivity may be provide in the broadband network 120 based on copper-based and/or fiber-optic wired connections and/or wireless links, via standards-based interfaces. The broadband-TV head-end 118 and the broadband network 120 may correspond to, for example, an Internet Protocol Television (IPTV) system.

The set-top box 122 may comprise suitable logic, circuitry, interfaces and/or code when may enable processing TV and/or multimedia streams/signals received from one or more TV head-ends, to enable generation of video and/or audio data that may be played via the display device 102. In this regard, the set-top box 122 may perform at least some of the video/audio processing, and/or may also provide additional functions, such as encryption and/or access control related functions, such as digital right management (DRM) related processing.

The AV player device 124 may comprise suitable logic, circuitry, interfaces and/or code that enable providing video/audio feeds to the display device 102. The AV player device 124 may comprise, for example, a digital video disc (DVD) player, a Blu-ray player, a digital video recorder (DVR), a video game console, surveillance system, and/or personal computer (PC) capture/playback card. For example, the AV player device 124 may read and/or process multimedia data stored into multimedia storage devices 126, which may comprise DVD and/or Blu-ray discs, and may generate corresponding video and/or audio data that may be displayed via the display device 102. While the set-top box 122 and the AV player device 124 are shown are separate entities, at least some of the functions performed via the top box 122 and/or the AV player device 124 may be integrated directly into the display device 102.

In operation, the display device 102 may be utilized to play video streams, which may be received from broadcast head-ends and/or from one or more local sources, such as the AV player device 124. The display device 102 may, for example, receive TV broadcasts via the TV antenna 108 from the terrestrial-TV head end 104; cable-TV broadcasts, which may be communicated by CATV head-end 110 via the CATV distribution network 112; satellite TV broadcasts, which may be received via the satellite receiver 116; and/or Internet multimedia broadcasts, which may be communicated by the broadband-TV head-end 118 via the broadband network 120. TV head-ends may utilize various formatting schemes in TV broadcasts. Historically, TV broadcasts have utilized analog modulation format schemes, comprising, for example, NTSC, PAL, and/or SECAM. Audio encoding may comprise utilization of separate modulation scheme, comprising, for example, BTSC, NICAM, mono FM, and/or AM. More recently, however, there has been a steady move towards Digital TV (DTV) based broadcasting. For example, the terrestrial-TV head-end 104 may be enabled to utilize ATSC and/or DVB based standards to facilitate DTV terrestrial broadcasts. The display device 102 may be operable to directly process multimedia/TV broadcasts to enable playing of corresponding video and/or audio data. Alternatively, an external device, for example the set-top box 122, may be utilized to perform processing operations and/or functions, which may be operable to extract video and/or audio data from received media streams, and the extracted audio/video data may then be played back via the display device 102. The display device 102 may also be utilized to display video data inputted from the local sources, such as the AV player device 124. In this regard, the AV player device 124 may read and/or process multimedia data stored into multimedia storage devices, such as DVD or Blu-ray discs, and may generate corresponding video data that may be displayed via the display device 102.

In an exemplary aspect of the systems and methods, the display device 102 may support multi-input video display. In this regard, the display device 102 may be operable to concurrently display images corresponding to different sources and/or inputs. Accordingly, multiple input pictures may be spatially combined to generate a single corresponding output picture. The display device 102 may support picture-in-picture modes where pictures corresponding to multiple sources, such as different TV channels, may be displayed at the same time. Furthermore, some video standards, such as Blu-ray, may provide for multiple sub-streams. In this regard, the Blu-ray standard allows for, in addition to the main video stream, other secondary video streams, such as graphics stream for example. Accordingly, multiple input pictures may be spatially combined to generate a single corresponding output picture that may be displayed via the display device 102. Various techniques may be utilized to combine multiple input pictures in order to generate singular corresponding pictures. For example, pictures from multiple inputs may be combined using blending, where blending factors may be used to fade one of the input pictures relative to remaining inputs. The blending operation may expressed utilizing the following expression:

$$\text{Output}(pix) = \alpha * \text{Input}_A(pix) + (1-\alpha) * \text{Input}_B(pix)$$

where $Input_A$ is a first (e.g. main) input video stream, $Input_B$ is a second (e.g. secondary) input video stream, α is the blending factor, and Output is an output stream resulting from combining $Input_A$ and $Input_B$. In this regard, the blending operation is applied to each pixel and its spatial counterpart in the input streams $Input_A$ and $Input_B$, to generate the spatially corresponding pixel in the output stream Output. Accordingly, modifying the value of the blending factor α may enable adjusting of the fading effect such that pixels corresponding to, for example, $Input_A$ may overlap their spatial counterpart pixel in $Input_B$.

Input pictures may also be combined using keying techniques. In keying, a range may be defined for input video steams such that pixels falling within the keying range (keyed pixels) may be overlaid or covered by pixels from other input streams, and pixels outside the keying range (visible pixels) are displayed over other input streams. For example, a keying range may be applied to input stream $Input_B$, by defining a keying threshold value KeyMax for example, such that pixels in the input stream $Input_B$ with values in the range {0, Key-Max} would be keyed pixels, and pixels with values greater than KeyMax would be visible pixels. Accordingly, keying-based input combining may be expressed utilizing the following expression:

$$Output(pix)=Input_B(pix)≤KeyMax?Input_A(pix):Input_B$$

$$Output(pix)=α*Input_A(pix)+(1-α)*Input_B(pix) (pix)$$

In this regard, the keying operation, supra, is applied to each pixel and its spatial counterpart in the input streams $Input_A$ and $Input_B$, to generate the spatially corresponding pixel in the output stream, Output. Accordingly, each pixel in the output stream is set to the value of its spatial counterpart pixel in the secondary input stream $Input_B$ if that pixel is a visible pixel (i.e., its value is greater than KeyMax); otherwise, if that pixel is a keyed pixel (i.e., its value is less than or equal to KeyMax), the corresponding pixel in the output stream is assigned the value of its spatial counterpart pixel in the main input stream $Input_A$ instead.

While keying and blending are described herein with regard to whole pixels as, the systems and methods need not be so limited. For example, keying may be applied separately to various components of pixels in input streams. For example, keying may be applied separately to chroma and luma components of pixels in input streams.

While use of keying may simplify processing of input streams, during multi-source combining operations for example, improper handling of keying-based input streams stream may cause issues and/or undesirable artifacts. These issues and/or artifacts may result from processing pixels in a manner that may result in corrupting the input stream by modifying values of visible pixels such that these pixel may inadvertently become keyed pixels (or vise versa). For example, when multiple video inputs are combined into a singular output stream, it may be desirable to render some of the input streams, such as a secondary stream, as small pictures (or windows) within larger pictures corresponding to other input streams, such as the main stream. Accordingly, the secondary input stream may be processed to adjust the size of corresponding images. This processing may comprise, for example, use of scaling to achieve the desired size adjustment of the secondary input steam. Scaling may utilize, for example, filtering of pixels, using polyphase filters for instance, for interpolation and/or area decimation purposes to enable creating larger or smaller images (or images of the same size but with higher or lower pixel resolution) corresponding to a set of pixels. In this regard, use of filtering during scaling operations may cause keyed pixels to become non-keyed, non-keyed pixels to become keyed, and/or may generate new pixels that may be interpreted as either keyed or non-keyed without any consideration for the original video content. Therefore, resulting pictures after scaling may comprise feature outlines, ghost patterns, and/or general sparkles randomly throughout the corresponding output pictures.

Accordingly, in various embodiments of the systems and methods, the display device 102, the AV player device 124 and/or the set-top box 122 may utilize keying-aware processing to guard against, mitigate, and/or remedy keying-related artifacts that may be caused during handling of input video streams, when combining multiple video inputs to generate singular output stream for example. In this regard, during processing of input video streams, in instances where it is determined that a processed input stream is a keying-based stream, type of pixels in the input stream may be tracked in order to determine whether they may be visible or keyed pixels. The pixels may then be processed accordingly based on the type of the processed pixels (i.e. whether they are visible or keyed pixels).

For example, during luma scaling operations, once it is determined that an input stream is a keying-based input stream, type of pixels in images in the stream may be tracked. In this regard, a binary map may be created and/or utilized for each image processed in the input stream, wherein the binary map may indicate which pixels in the image are keyed and which pixels are not. This may enable ensuring, for example, that keyed pixel values are not be used, for example, in filtering calculations during the scaling operations. Accordingly, scaling filter inputs may be modified and/or controlled to avoid luma key artifacts. To achieve that, scaling filters input may be modified to ensure that generation of visible output pixels may not include pixel values that may be within the keying range. In addition, when generating keyed output pixel, their values are checked and it may be clamped to ensure that they remain within the keying range. Determining whether an output pixel is a visible pixel or a keyed pixel may not be based on visible pixel values. Rather, this determination may be based the type of input pixels, whether keyed or visible, which are input to the filters. Furthermore, keyed-to-visible pixel boundaries, which may correspond to boundaries between keyed regions and visible regions in the image, may be treated as if they were the edge of the visible image (or region). In this regard, nearby visible input pixels may be used to replace keyed input pixels.

While the systems and methods have been described with regard to scaling operations, the systems and methods need not be so limited. Accordingly, other video processing operations, and/or any steps or procedures thereof, which may also cause or result in keying-related artifacts, may be performed, controlled, and/or configured to guard against, mitigate, and/or or remedy potential keying-related artifacts.

Figure 2A:
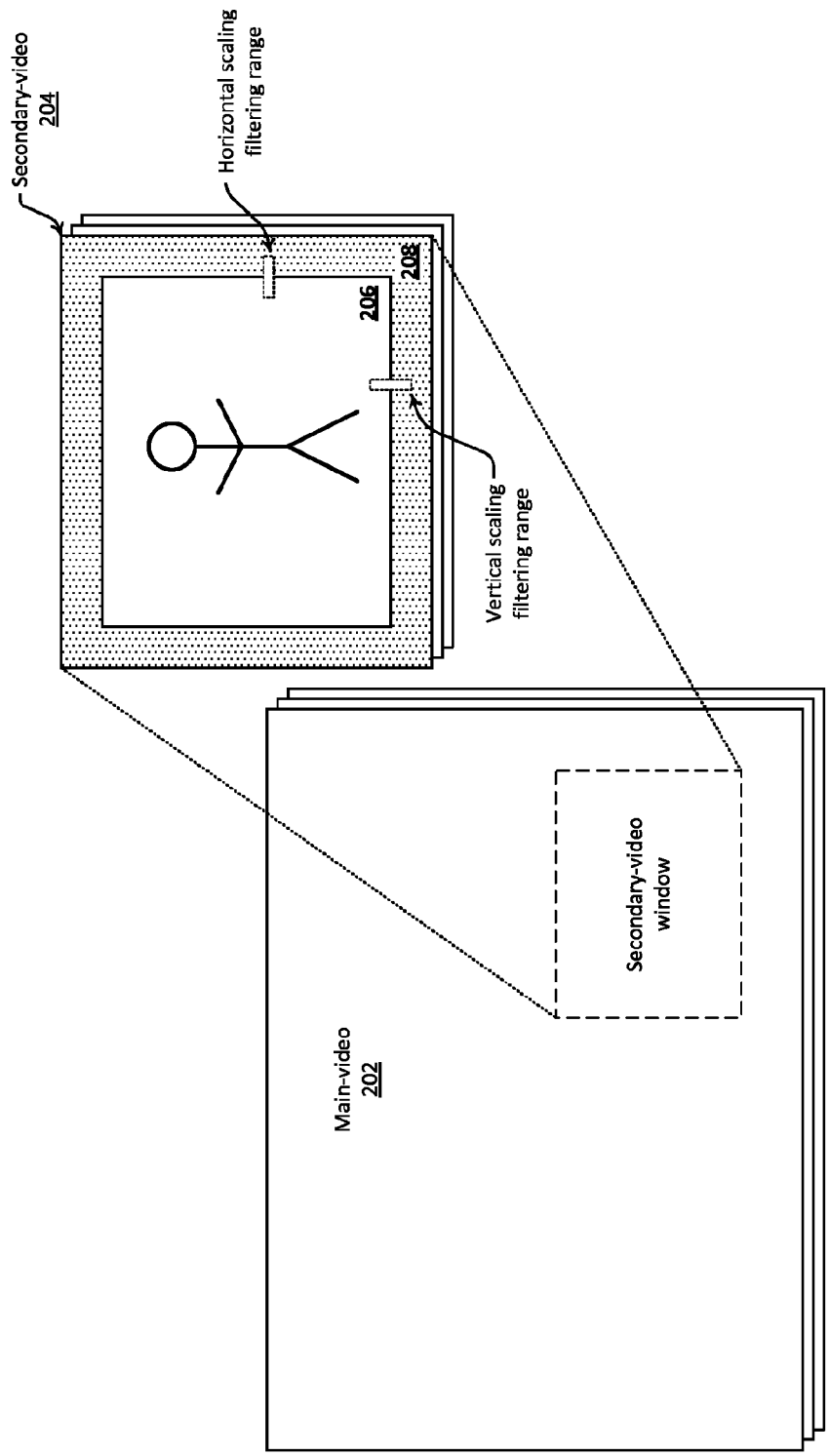
FIG. 2A is a block diagram illustrating exemplary multi-level video stream.

FIG. 2A is a block diagram illustrating exemplary multi-level video stream, which may be utilized in accordance with an embodiment of the systems and methods. Referring to FIG. 2A, there is shown images corresponding to main video stream 202, with which images corresponding to a secondary video stream 204 may be combined.

The secondary video stream 204 may be generated and/or configured as keying-based stream to enable use of keying based techniques, such as when combining images in the secondary video stream 204 with images in the main video stream 202. In this regard, a keying range may be defined for secondary video stream 204 such that pixels falling within the keying range (keyed pixels) may be overlaid or covered by pixels from other video streams, and pixels outside the keying range (visible pixels) are displayed over other video streams.

Keying may be applied to whole pixels, and/or to only components thereof (such as luma or chroma). For example, the secondary video stream 204 may be a luma-keyed stream, wherein a keying range may be defined for luma parameters corresponding to pixels in the secondary video stream 204, using a $KeyMax_{204}$ parameter for example. In this regard, pixels with luma values falling within the range {0, $KeyMax_{204}$} (or keyed pixels) may be overlaid or covered by pixels in other streams, such as, for example, corresponding pixels in the main video stream 202 during video input combining operations. Pixels with luma values greater than $KeyMax_{204}$ (or visible pixels) are displayed over other input streams during video input combining operations. Accordingly, images in the secondary video stream 204 may comprise a visible region 206 and a keyed region 208, wherein the visible region 206 may comprise visible pixels and the keyed region 208 may comprise the keyed pixels in each image.

In an exemplary embodiment of the systems and methods, images in the secondary video stream 204 may be scaled during video compositing operations, for example to decrease their size such that these images may only cover a portion of corresponding images in the main video stream 202. Scaling may comprise filtering sets of pixels in each image, using polyphase multi-tap finite impulse response (FIR) filters for example, to perform interpolation and/or area decimation related computation such that a larger or a smaller number of pixels may be generated for each image to enable creating larger or smaller corresponding image. In this regard, the scaling-related filtering may be performed using horizontal and/or vertical polyphase multi-tap FIR filters, on sets of contiguous pixels in rows and/or columns in each image in the secondary video stream 204. For example, to generate smaller images corresponding to the secondary video stream 204, horizontal scaling filters may operate on sets of 8-pixels in each row, wherein their luma parameters may be filtered to generate luma parameters for 4 corresponding pixels in a corresponding row in the scaled image. Similarly, a vertical scaling filter may operate on sets of 8-pixels in a single column, wherein their luma parameters may be filtered to generate luma parameters for 4 corresponding pixels in a corresponding column in the scaled image. In some instances, the sets of pixels processed via the horizontal filters and/or the vertical filters may comprise both visible and keyed pixels. This may cause artifacts resulting from, for example, pixels that should have been visible becoming keyed pixels as a result of the scaling-related filtering.

In various embodiments of the systems and methods, keying-aware processing may be utilized, for example, to guard against and/or remedy keying-related artifacts. In this regard, during scaling processing of the secondary video stream 204, for example, the type of pixels in the secondary video stream 204 may be tracked, to determine whether they may be visible or keyed pixels prior to, for example, any scaling-related filtering, and pixels may be filtered accordingly to ensure that unintended transition in the type of pixel may not occur. For example, inputs to scaling filters may be modified and/or controlled to ensure that generation of visible output pixels may not include any pixel values inside the keying range. In addition, when generating keyed output pixel, their values are checked and it may be clamped to ensure that they remain within the keying range. Determining whether an output pixel is a visible pixel or a keyed pixel is not based on visible pixel values. Rather, this determination may be based tracking of type of input pixels (whether keyed or visible) as inputted into the filters. Furthermore, keyed-to-visible pixel boundaries may be treated as if they were the edge of the visible image. In this regard, nearby visible input pixels may be used to replace keyed input pixels.

Figure 2B:
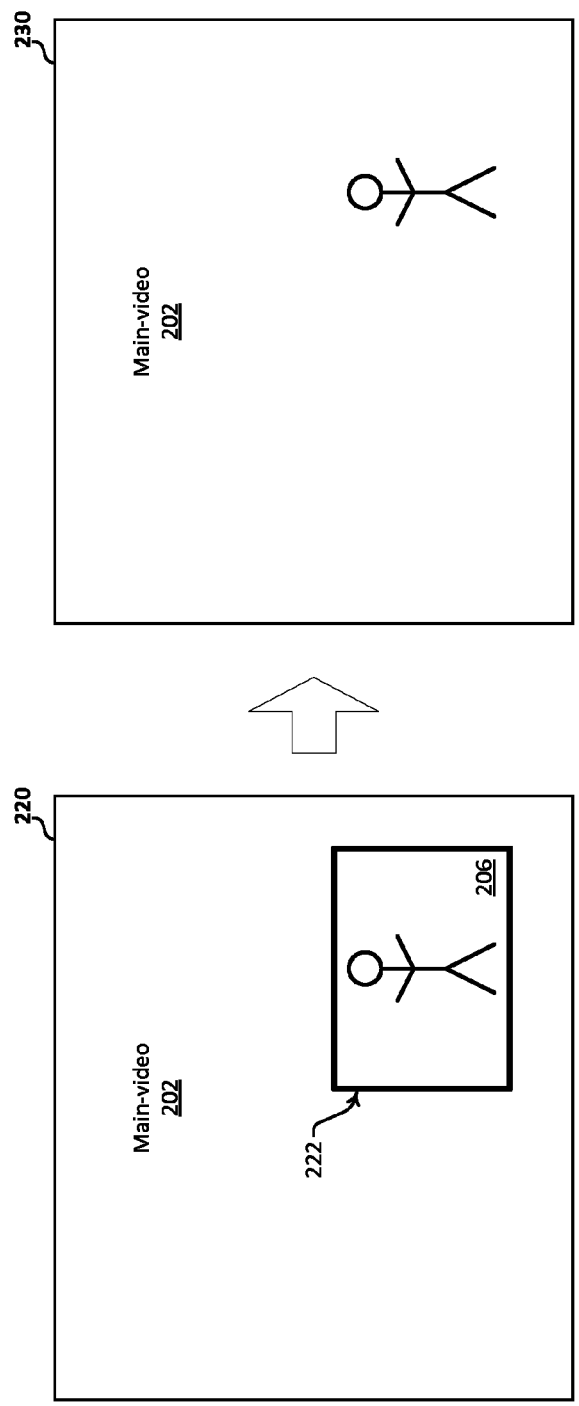
FIG. 2B is a block diagram illustrating an exemplary output image with keying-related artifacts that may result from scaling operations, which may be corrected by applying keying-aware scaling.

FIG. 2B is a block diagram illustrating an exemplary output image with keying-related artifacts that may result from scaling operations, which may be corrected by applying keying-aware scaling, in accordance with an embodiment of the systems and methods. Referring to FIG. 2B, there are shown images 220 and 230, which may be generated by combining images from the main video stream 202 and scaled images in the secondary video stream 204 is shown.

The image 220, which may be generated without use of key-aware processing, may comprise an edge artifact 222 corresponding to the edge between the visible region 206 and the keyed region 208. The edge artifact 200 may appear as a visible line, within what may have been the keyed region 208, surrounding the visible region 206. The edge artifact 222 may be caused when scaling images corresponding to the secondary video stream 204, as result of uncontrolled horizontal and vertical scaling related filtering on boundaries between the visible region 206 and the keyed region 208. The edge artifact 222 may result when luma values corresponding to pixels in the keyed region 208 being modified during horizontal and vertical scaling-related filtering operations such that their values falling within the visible range, i.e. becoming greater than $KeyMax_{204}$, which renders these pixels visible. Use of key-aware processing, such as luma key-aware scaling for example, substantially as described with regard to FIG. 2A, may prevent the edge artifact 222 by tracking type of pixels during video processing to determine when the processed pixels are keyed pixels to ensure that corresponding pixels in the scaled image remain keyed and does not transition to visible pixel.

Figure 3:
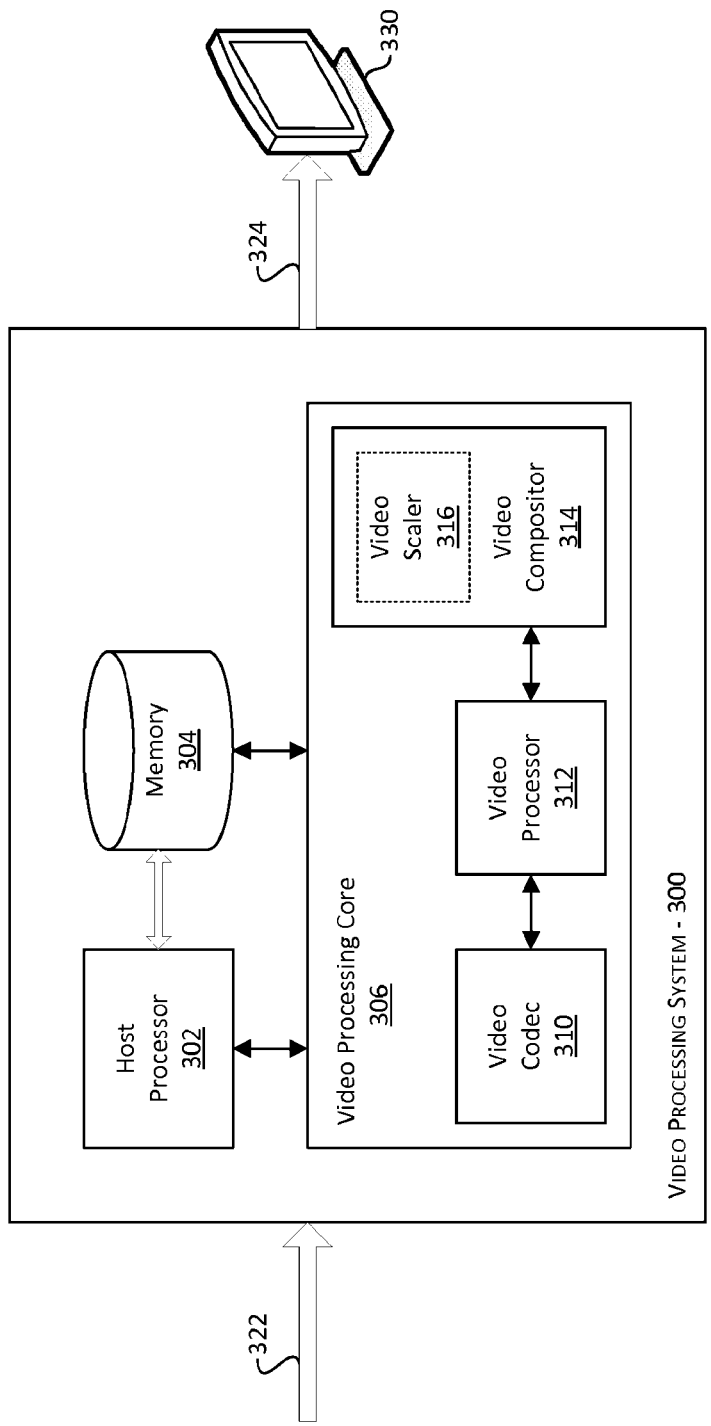
FIG. 3 is a block diagram illustrating an exemplary video processing system that may utilize key-aware scaling.

FIG. 3 is a block diagram illustrating an exemplary video processing system that may utilize key-aware scaling, in accordance with an embodiment of the systems and methods. Referring to FIG. 3, there is shown a video processing system 300, an input video stream 322, an output video stream 324, and a display system 330.

The video processing system 300 may comprise suitable logic, circuitry, interfaces and/or code that may enable processing of input video streams, and/or generation of video playback streams. In this regard, the video processing system 300 may comprise a host processor 302, a system memory 304, and a video processing core 306.

The host processor 302 may comprise suitable logic, circuitry, interfaces and/or code that may be operable to process data, and/or control and/or manage operations of the video processing system 300, and/or tasks and/or applications performed therein. In this regard, the host processor 302 may be operable to configure and/or control operations of various components and/or subsystems of the video processing system 300, by utilizing, for example, one or more control signals. The host processor 302 may also control data transfers within the video processing system 300. The host processor 302 may enable execution of applications, programs and/or code, which may be stored in the system memory 304, for example. The system memory 304 may comprise suitable logic, circuitry, interfaces and/or code that may enable permanent and/or non-permanent storage, buffering, and/or fetching of data, code and/or other information which may be used, consumed, and/or processed in the video processing system 300. In this regard, the system memory 304 may comprise different memory technologies, including, for example, read-only memory (ROM), random access memory (RAM), Flash memory, solid-state drive (SSD), and/or field-programmable gate array (FPGA). The system memory 304 may store, for example, configuration data, which may comprise parameters and/or code, comprising software and/or firmware, but the configuration data need not be limited in this regard.

The video processing core 306 may comprise suitable logic, circuitry, interfaces and/or code that may be operable to perform video processing operations. The video processing core 306 may be operable to process the input video stream 322, received via the video processing system 300, to enable generation of the output video stream 324 for display via the display system 330. In this regard, the video processing core 306 may comprise, for example, a video encoder/decoder (codec) 310, a video processor 312, and a video compositor 314, which may comprise a video scaler 316.

The video codec 310 may comprise suitable logic, circuitry, interfaces and/or code for performing video encoding and/or decoding. For example, the video codec 310 may be operable to process received encoded and/or compressed video data, performing, for example, video decompression and/or decoding operations. The video codec 310 may also be operable to decode and/or format video data which may be generated via the video processing core 306, as part of the output video stream 324. In this regard, the video codec may be operable to decode and/or encode video data formatted based on based on one or more compression standards, such as, for example, H.262/MPEG-2 Part 2, H.263, MPEG-4 Part 2, H.264/MPEG-4 AVC, AVS, VC1, and/or VP6/7/8. Furthermore, in instances where received compressed/encoded video data is communicated via transport streams, which may be received as TV broadcasts and/or local AV feeds, the video codec 310 may be operable to demultiplex and/or parse the received transport streams to extract video data within the received transport streams. The video codec 310 may also perform additional operations, including, for example, security operations such as digital rights management (DRM).

The video processor 312 may comprise suitable logic, circuitry, interfaces and/or code that may be operable to perform video processing operations on received video data, after it has been decoded and/or decompressed, to facilitate generation of corresponding output video data, which may be played via, for example, the display system 330. In this regard, the video processor 312 may be operable to perform such operations as de-noising, de-blocking, restoration, deinterlacing and/or video sampling.

The video compositor 314 may comprise suitable logic, circuitry, interfaces and/or code that may be operable generate output video data suitable for display via one or more display devices, based on input video data processed via the video processing core 306. For example, the video compositor 314 may perform various operations to ensure that the generated output video stream 324 may be suited for playback via the display system 330. The video compositor 314 may be operable to perform, for example, motion estimation and/or compensation, frame up/down-conversion, cropping, and/or scaling. In this regard, the video compositor 314 may utilize the video scaler 316 during scaling operations.

The video scaler 316 may comprise suitable logic, circuitry, interfaces and/or code that may be operable to perform scaling operations, which may enable modifying size and/or pixel resolution in output images. For example, pixel resolution may be increased or reduced such that the resulting output images would comprise the same pixel resolution as the screen in the display device. Similarly, a size of the output images, compared to corresponding images in the input video stream may be increased and/or reduced, to match the size of a screen in, for example, the display system 330, and/or a window therein that may allocated for display the output images. In an exemplary aspect of the systems and methods, the scaling operation performed via the video scaler 316 may comprise filtering groups of pixels in each image, using one or more polyphase multi-tap finite impulse response (FIR) filters for example, to perform interpolation and/or area decimation related computation, such that a corresponding larger (or smaller) number of pixels may be generated accordingly for corresponding output image.

The display system 330 may comprise suitable logic, circuitry and/or code that may enable performing display operations based on the output video stream 324, generated via the video processing system 300. The display system 330 and the video processing system 300 may be integrated within a single device, such as the display device 102 for example. Alternatively, the display system 330 and the video processing system 300 may be integrated in different devices, which may be coupled together to enable playback operations. For example, the display system 330 may correspond to the display device 102 for example whilst the video processing system 300 may be integrated within a separate device, such as the set-top box 122 or the AV Player device 124, which may be utilized to perform dedicated video processing operations.

The input video stream 322 may comprise a data stream containing video information. The input video stream 322 may comprise, for example, an encoded video stream which may be generated and/or communicated, for example, via television head-ends and/or audio/video playback devices. For example, the input video stream 322 may comprise Blu-ray video input, which may be extracted via the AV player device 124 from, for example, Blu-ray discs. The output video stream 324 may comprise video data that may be suitable for display or playback via one or more display means, such as the display system 330 for example.

In operation, the video processing system 300 may be operable to perform video display and/or playback operations, to facilitate, for example, displaying of images corresponding to video data received via the input video stream 322. The video processing system 300 may be operable to perform video processing operations, via the video processing core 306, which may enable, for example, generation of the output video stream 324 which may be displayable via the display system 330.

In an exemplary aspect of the systems and methods, the video processing system 300 may be utilized to combine multiple input streams (or sub-streams in the input video stream 322 for example) into a single output stream, such as the output video stream 324. In this regard, the input streams may be decoded and/or processed, in parallel or sequentially, via the video codec 310 and video processor 312. The video streams may then be combined, via the video compositor 314. During these operations, at least one of the combined input streams may be scaled, via the video scaler 316, to modify pixel resolution and/or to resize corresponding images combined into the output stream 324. In instances where the scaled input stream(s) comprise keyed pixels, artifacts may result during the scaling operations, substantially as described with regard to FIGS. 2A and 2B.

Accordingly, in various exemplary embodiments of the systems and methods, video processing operations performed via the video processing system 300, including scaling operations performed via the video scaler 316, may be configured as key-aware operations. In this regard, once it is determine that an input stream comprises keyed and visible pixels, the type of pixels in images in the input stream may be tracked during processing thereof, by creating a binary map for each image in the input stream. The binary map may be utilized to indicate and/or describe which pixels are keyed and which pixels are not. The binary map may be stored into, and retrieved from, the system memory 304 during processing operations. For example, during scaling operations, in instances where it is determined that pixels in an input stream comprise luma keyed values, and the corresponding keying binary maps are generated and/or updated accordingly, the keying binary maps may be used to ensure that keyed pixel luma values would not be used in filtering calculations during the scaling operations. Accordingly, inputs to one or more scaling filters may be modified and/or controlled to avoid, mitigate, and/or prevent luma key artifacts. To achieve that, the inputs to the scaling filters may be modified to ensure that generation of visible output pixels may not include any pixel values inside the keying range. In addition, when generating keyed output pixels, their values are checked and it may be clamped to ensure that they remain within the keying range. Therefore, determining whether an output pixel is a visible pixel or a keyed pixel may not be based on visible pixel values. Rather, this determination may be based on tracking of type of input pixels (whether keyed or visible) as inputted into the filters. Furthermore, keyed-to-visible pixel boundaries may be treated as if they were the edge of the visible image. In this regard, nearby visible input pixels may be used to replace keyed input pixels.

Figure 4A:
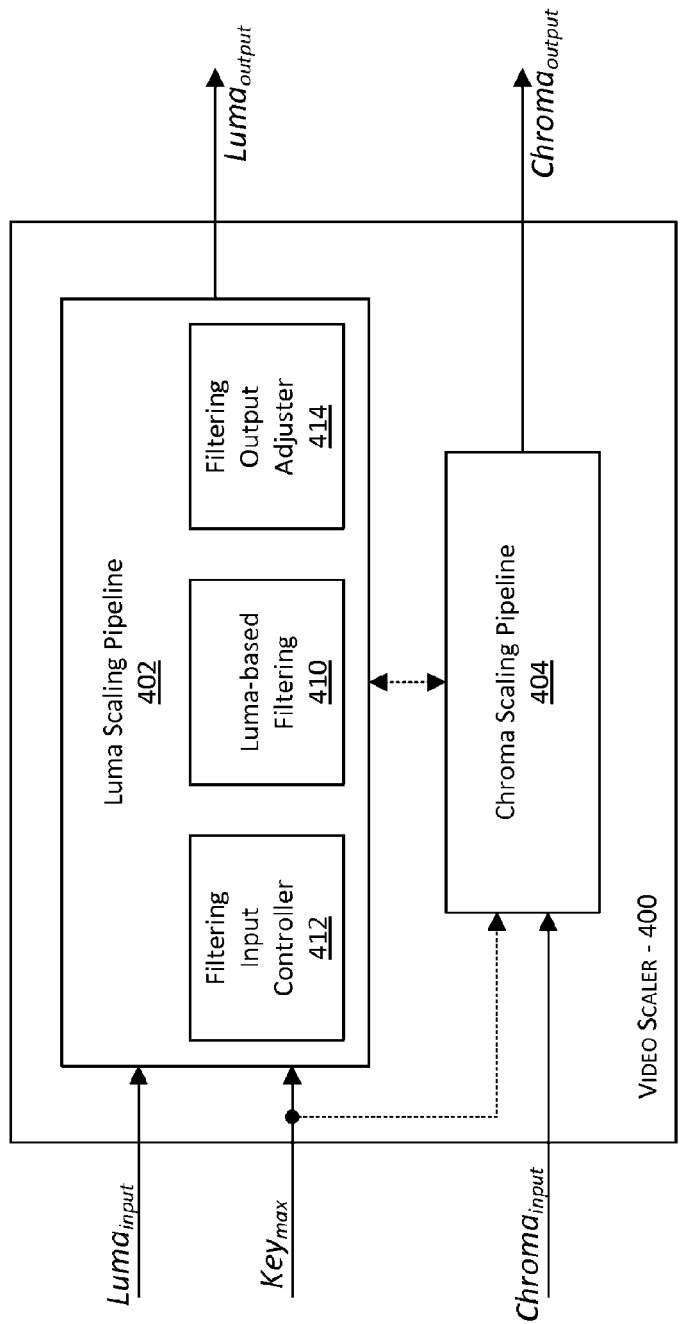
FIG. 4A is a block diagram illustrating an exemplary video scaler.

FIG. 4A is a block diagram illustrating an exemplary video scaler, in accordance with an embodiment of the systems and methods. Referring to FIG. 4A, there is shown a video scaler 400, which may be similar to the video scaler 316, substantially as described with regard to, for example, FIG. 3.

The video scaler 400 may comprise suitable logic, circuitry, interfaces and/or code that may be operable to perform scaling operations. In an exemplary embodiment of the systems and methods, the video scaler 400 may comprise a luma scaling pipeline 402 and a chroma scaling pipeline 404. The luma scaling pipeline 402 may comprise suitable logic, circuitry, interfaces and/or code that may be operable to perform scaling operations on luma components of pixels. The chroma scaling pipeline 404 may comprise suitable logic, circuitry, interfaces and/or code that may be operable to perform scaling operations on chroma components of pixels. The luma scaling pipeline 402 may comprise, for example, a luma-based filtering block 410, a filtering input controller 412, and a filtering output adjuster 414.

The luma-based filtering block 410 may comprise suitable logic, circuitry, interfaces and/or code that may be operable to perform filtering of luma components in pixels during video scaling. The luma-based filtering block 410 may comprise a plurality of polyphase multi-tap finite impulse response (FIR) filters that may be receive one or more input luma values, corresponding to one or more pixels in an input stream, and may generate one or more output luma values, which may be apply to corresponding pixels in the output image(s).

The filtering input controller 412 may comprise suitable logic, circuitry, interfaces and/or code that may be operable to control inputs to the luma-based filtering block 410, based on keying related information and/or parameters, for example, to prevent and/or mitigate possible luma-keying related artifacts. In this regard, the filtering input controller 412 may modify the luma inputs to the luma-based filtering block 410, in instances where the corresponding pixels, or the luma parameters thereof, are determined to be keyed, for example.

The filtering output adjuster 414 may comprise suitable logic, circuitry, interfaces and/or code that may be operable to adjust outputs from the luma-based filtering block 410, based on keying related information and/or parameters for example, to prevent and/or mitigate possible luma-keying related artifacts. In this regard, the filtering output adjuster 414 may modify outputs from the luma-based filtering block 410.

In operation, the video scaler 400 may be operable to perform scaling operations, on sets of pixels in input streams, for example, to enable generation of pixels in corresponding output images. In this regard, the luma scaling pipeline 402 may be utilized to perform scaling operations on luma components of input pixels whereas the chroma scaling pipeline 404 may be utilized to perform scaling operations on luma components on input pixels. Furthermore, to enhance the outcome of scaling operation, the luma scaling pipeline 402 and the chroma scaling pipeline 404 may interact during scaling operation to ensure that scaling outcomes of the two pipelines are correlated. The scaling operations in the luma scaling pipeline 402 and chroma scaling pipeline 404 may also be performed sequentially, such that luma scaling may be performed first, for example, and then the chroma scaling is performed based on the input chroma parameters and outputs from the luma scaling operations.

In an exemplary aspect of the systems and methods, the luma scaling pipeline 402 may be configured to perform luma scaling as keying-aware operation. In this regard, because filtering that is performed during scaling may cause luma-keying related artifacts, the filtering input controller 412 and/or the filtering output adjuster 414 may be utilized to prevent or mitigate these artifacts. The filtering input controller 412 and/or the filtering output adjuster 414 may be utilized, for example, to control inputs to and/or outputs from scaling related filtering operations, which may be performed by the luma-based filtering block 410 for example. For example, the filtering input controller 412 may be used to guard against unintended keyed-to-visible transitions by modifying inputs to the luma-based filtering block 410 which may correspond to keyed pixels and/or keyed luma values thereof. The filtering output adjuster 414 may also be used to guard against unintended keyed-to-visible transitions by modifying outputs from the luma-based filtering block 410 in instances where these outputs are determined to correspond to keyed pixels for example.

While the systems and methods has been described with regard to the luma scaling operations, the systems and methods need not be so limited. In this regard, chroma scaling operations may also be controlled, configured, and/or managed to prevent and/or mitigate keying-related artifact in instances where processed pixels may comprised keyed chroma parameters. Accordingly, the chroma scaling pipeline 404 may be configured, for example, in similar manner as described herein with regard to the luma scaling pipeline 402. In this regard, inputs to and/or outputs from filters utilized during chroma scaling may also be controlled, modified, and/or adjusted to guard against unintended keyed-to-visible transitions with regard to the chroma parameters. In cases where both the luma scaling pipeline 402 and the chroma scaling pipeline 404 are both implemented as keying-aware processing blocks, keying-aware chroma scaling may be performed after keying-aware luma scaling, or keying-aware luma scaling may be performed after keying-aware chroma scaling is performed.

Figure 4B:
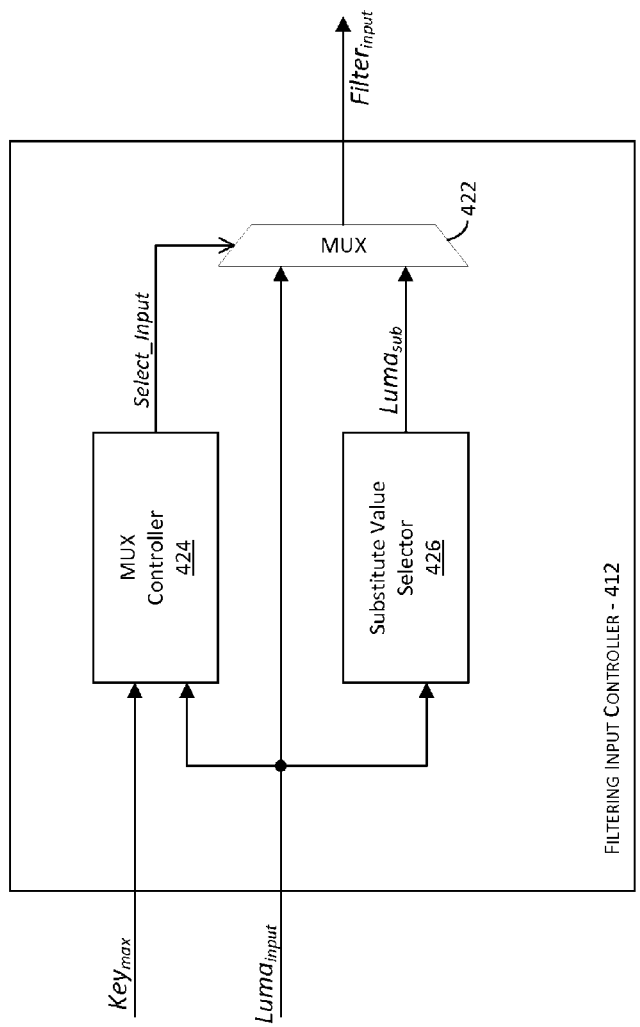
FIG. 4B is a block diagram illustrating an exemplary filtering input controller in a video scaler.

FIG. 4B is a block diagram illustrating an exemplary filtering input controller in a video scaler, in accordance with an embodiment of the systems and methods. Referring to FIG. 4B, there is shown the filtering input controller 412, which may comprise a Mux 422, a Mux controller 424, and a substitute value selector 426.

The Mux 422 may comprise suitable logic, circuitry, interfaces and/or code that may be operable to select an output from a plurality of inputs, based on one or more control signals. In this regard, the Mux 422 may select an output from two inputs, $Luma_{input}$, which correspond to value of luma component in an input pixel; and $Luma_{sub}$, which correspond to a substitution luma value which may be generated for the input pixel, via the substitute value selector 426 for example. The Mux 422 may be driven, in selecting outputs, by a select_input control signal, which may be generated by the Mux controller 424.

The Mux controller 424 may comprise suitable logic, circuitry, interfaces and/or code that may be operable to generate at least the select_input control signal, which may be utilized in controlling selection via the Mux 422. In this regard, the Mux controller 424 may operate based on $Key_{max}$ input, which defines the keying range in an input stream. In this regard, during scaling operations, pixels with luma values equal or less than $Key_{max}$ may be considered keyed pixels, whereas pixels with luma values greater than $Key_{max}$ may be considered visible pixels.

The substitute value selector 426 may comprise suitable logic, circuitry, interfaces and/or code that may be operable to provide a substitute luma value, $Luma_{sub}$, which may be selected, via the Mux 422, in lieu of a $Luma_{input}$ parameter corresponding to an input pixel, such as when the input pixel is determined to be luma-keyed pixel. In an exemplary aspect of the systems and methods, the $Luma_{sub}$ parameter may be configured based on luma value of one or more other pixels, which may be selected based on a selection algorithm and/or parameters that may be programmed into the substitution value selector 426.

In operation, the filtering input controller 412 may control inputs to the filtering luma-based filtering block 410, to prevent and/or mitigate keying-related artifacts. In this regard, the Mux 422 may select an output $Filter_{input}$, which may correspond to an input to the luma-based filtering block 410, from $Luma_{input}$ and $Luma_{sub}$. The Mux 422 may perform the selection based on the select_input control signal, which may be generated by the Mux controller 424. In this regard, the select_input control signal may be set to, for example, '1' to indicate that $Luma_{input}$ is to be selected, or it may be set to '0' to indicate that $Luma_{sub}$ may be selected instead. In generating the select_input control signal, the Mux controller 424 may compare the $Luma_{input}$ against the $Key_{max}$ parameter. In this regard, the select_input control signal may be set to '1' if $Luma_{input} \geq Key_{max}$ (i.e. if the pixel is visible rather than keyed).

Various algorithms and/or techniques may be utilized, via the substitute value selector 426 for example, to generate the $Luma_{input}$ parameter, which may be selected, as the $Filter_{input}$, in instances where the input pixel comprises a keyed luma value. For example, once a pixel is determined to be a keyed pixel, nearest neighbor based algorithms may be utilized to select a plurality of nearest neighboring pixels. The selected pixels' values may be utilized to generate a substitute value which may be used, as a filtering input, in lieu of the keyed pixel. For example, in instances where the filtering operations comprises use of 8-tap FIR filters, which may operate on groups of 8-pixels, the nearest neighboring algorithm may be configured such that when a pixel is determined to be a keyed pixel, the remaining pixels are searched starting from the closest pixels. Among pixels that are equally separated from the keyed pixel, pixels to the right (or below) the keyed pixel may be searched first, until the first visible pixel is found. The $Luma_{sub}$ may then be set to the luma value of the first visible pixel that is found.

Figure 4C:
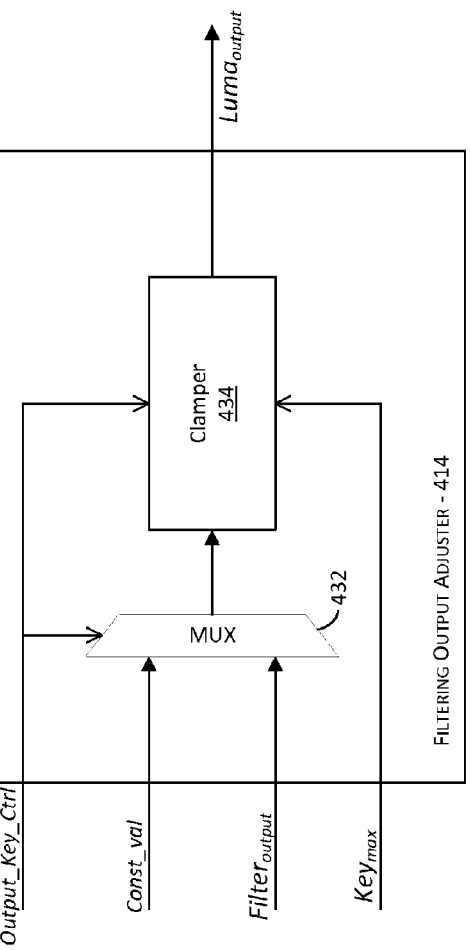
FIG. 4C is a block diagram illustrating an exemplary filtering output adjuster in a video scaler.

FIG. 4C is a block diagram illustrating an exemplary filtering output adjuster in a video scaler, in accordance with an embodiment of the systems and methods. Referring to FIG. 4C, there is shown the filtering output adjuster 414, which may comprise a Mux 432, and a clamper 434.

The Mux 432 may similar to the Mux 422, substantially as described with regard to, for example, FIG. 4B. In this regard, the Mux 432 may select an output from two inputs, $Filter_{output}$, which may correspond to output of the luma-based filtering block 410; and const_val, which may comprise a predetermined constant value that may be utilized in lieu of the output of the luma-based filtering block 410. The Mux 432 may be driven, in selecting outputs, by an output_key_ctrl control signal, which may be generated via the luma-based filtering block 410 for example.

The clamper 434 may comprise suitable logic, circuitry, interfaces and/or code that may be operable to modify an input parameter, to ensure that the value of the input parameter does not exceed (or fall below) a predetermined limit.

In operation, the filter output adjuster 414 may be utilized to adjust and/or modify outputs of the luma-based filtering block 410, to enable preventing and/or mitigating keying-related artifacts. In this regard, the Mux 432 may select an output from $Filter_{output}$, which may correspond to output of the luma-based filtering block 410, and const_val. The const_val may be set to a keyed value, in the $\{0, Key_{max}\}$ range. In an exemplary aspect of the systems and methods, const_val may be set to 0, such that the corresponding $Luma_{output}$ may indicate the corresponding pixel is completely keyed (i.e. transparent). The Mux 432 may perform the selection based on the output_key_ctrl control signal. For example, the output_key_ctrl control signal may be set to, for example, '1' to indicate that const_val is to be selected, or it may be set to '0' to indicate that $Filter_{output}$ may be selected instead. The output_key_ctrl may indicate whether the current pixel is to be treated as visible or keyed pixel. In this regard, the output_key_ctrl control signal may be generated via the luma-based filtering block 410, based on filtering operations performed therein. For example, in instances where the filtering operations performed via the luma-based filtering block 410 comprises use of 8-tap FIR filters, which may operate on groups of 8-pixels, output_key_ctrl control signal may be set based on keyed/visible status of the two center pixels (i.e. pixels 4 and 5) in each group of 8 pixels being filtered. In this regard, the output_key_ctrl control signal may be set to '1' if both pixels are keyed. In instances, where only one of the two center pixels is keyed, the current phase of the filter may be utilized to determine which of the two center pixels is closer to the currently filtered pixel, and the output_key_ctrl control signal may be set based on the keyed status of the closer center pixel.

The output of the Mux controller 432 may be clamped via the clamper 434. In this regard, the clamper 434 may first verify that the value of the output of the Mux controller 432 is not const_val, which would simply be passed without any change. This step may simply be performed based on the output_key_ctrl control signal since it is utilized to select (or not) const_val via the Mux 434. If the output of the Mux controller 432 is not const_val, the clamper 434 would compare the output against $Key_{max}$, and would clamp the value to make it within the visible range (e.g., clamp $Luma_{output}$ to $Key_{max}+1$).

Figure 5:
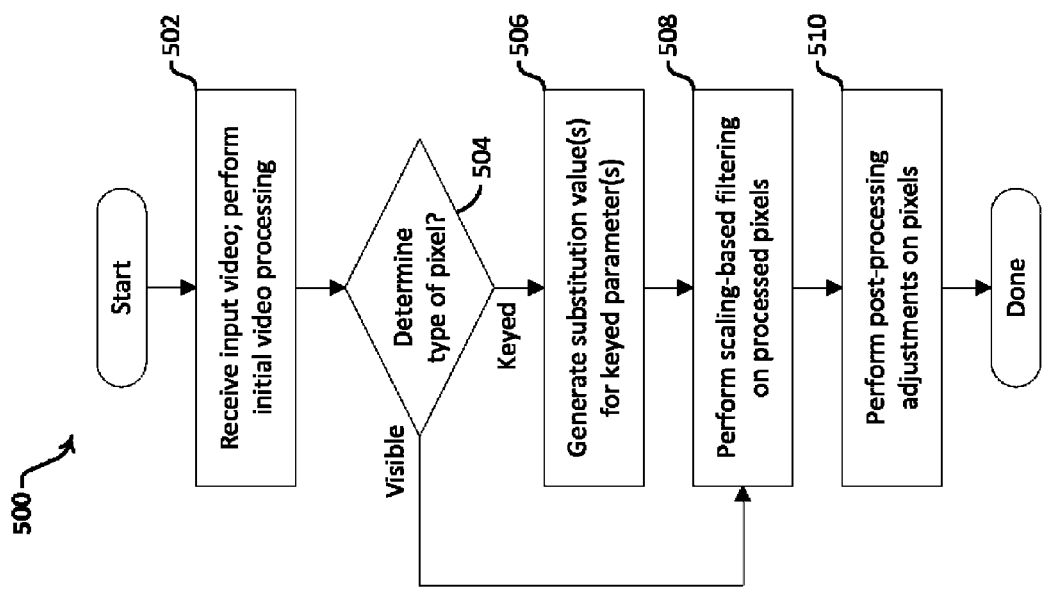
FIG. 5 is a flow chart that illustrates exemplary steps for luma key aware scaling.

FIG. 5 is a flow chart that illustrates exemplary steps for luma key aware scaling, in accordance with an embodiment of the systems and methods. Referring to FIG. 5, there is shown a flow chart 500 comprising a plurality of exemplary steps that may be performed for luma key aware scaling during video processing.

In step 502, an input video may be received, and initial video processing may be performed on the received input stream. In step 504, a type of pixel that is being currently processed may be determined. In instances where the current pixel may be determined to be a visible pixel, the plurality of exemplary steps may skip to step 508. Returning to step 504, in instances where the current pixel may be determined to be a visible pixel, the plurality of exemplary steps may proceed to step 506. In step 506, substitution value(s) for keyed parameter(s) in processed pixels may be generated and/or determined. For example, during luma scaling operations, the filtering input controller 412 may be utilized to control and/or modify inputs to the luma-based filtering block 410, substantially as described with regard to FIG. 4C. In step 508, scaling-based filtering may be performed on processed pixels. In step 510, post-processing adjustments may be performed on processed pixels. For example, the filtering output adjuster 414 may be utilized to adjust outputs of the luma-based filtering block 410, substantially as described with regard to, for example, FIG. 4C.

Various embodiments of the systems and methods may comprise a method and system for key aware scaling. The video processing system 300 may be utilized to process video inputs, such as the video input 322, which may comprise a plurality of streams, wherein images corresponding to at least some of the plurality of streams may be displayed concurrently, using the display system 330 for example. In this regard, one or more of the video streams whose images may be displayed concurrently may comprise keyed video parameters, and the processing performed by the video processing system 300 may be configured and/or performed as keying-aware processing. The keyed video parameters may comprise keyed luma and/or keyed chroma parameters. The keying-aware processing may comprise luma and/or chroma keying-aware scaling, which may be performed via the video scaler 316. The keying-aware luma scaling performed therein may comprise determining, via the filter input controller 412, whether a current pixel comprises keyed luma parameter. In instance where it is determined that the current pixel comprises keyed luma, one or more other pixels may be selected, via the substitute value generator 426 for example, and a substitute value corresponding to the keyed luma parameter of the current pixel may be generated, via the substitute value generator 426 for example, based on the selected one or more other pixels. In this regard, the generated substitute video parameter may be utilized during scaling filtering operations corresponding to the current pixel. The pixels used to generate the substitute video parameter may be selected based on nearest neighbor based algorithms. Outputs of the processing of the current pixel, such as luma scaling related filtering operations via the luma-based filtering block 410 for, may be post-processed, via the filtering output adjuster 414 for example. This may comprise clamping the output luma parameter, based on keying range for example.

Other embodiments of the systems and methods may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for key aware scaling.

Accordingly, the present systems and methods may be realized in hardware, software, or a combination of hardware and software. The present systems and methods may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present systems and methods may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present systems and methods has been described with reference to certain embodiments, it will be understood by those skilled in the art that various changes may be made and equivalents may be substituted without departing from the scope of the present systems and methods. In addition, many modifications may be made to adapt a particular situation or material to the teachings of the present systems and methods without departing from its scope. Therefore, it is intended that the present systems and methods not be limited to the particular embodiment disclosed, but that the present systems and methods will include all embodiments falling within the scope of the appended claims.

What is claimed is:

1. A method comprising:
in a video processing device that is operable to process video, determining whether an input pixel includes a keyed video parameter prior to filtering the input pixel;
generating a non-keyed substitute pixel for the input pixel that includes the keyed video parameter; and
outputting, via a filter, the non-keyed substitute pixel if the input pixel included the keyed video parameter, otherwise outputting the input pixel.

2. The method of claim 1 further comprising clamping an output pixel to ensure that the output pixel includes a non-keyed video parameter.

3. The method according to claim 1, wherein generating the non-keyed substitute pixel includes selecting a pixel parameter based on a nearest neighbor criterion.

4. The method according to claim 1, wherein generating the non-keyed substitute pixel includes selecting a pixel parameter based on a visible edge pixel.

5. The method according to claim 1, wherein the filtering comprises scaling.

6. The method of claim 1, wherein the filtering includes luma based filtering.

7. The method of claim 1, wherein the filtering includes chroma based filtering.

8. The method of claim 1, wherein determining whether the input pixel includes the keyed video parameter includes determining if the input pixel is within a keying range.

9. A system, comprising:
a video processing device to process video;
a substitute value selector to generate a substitute pixel based on an input pixel in the video processing device;
a multiplexer to send the input pixel or the substitute pixel to a filter based on whether the input pixel is within a keying range; and
an output of the filter to provide the substitute pixel as an output pixel if the input pixel is within the keying range.

10. The system of claim 9 further comprising a clamper connected to the output, wherein the clamper configured to ensure that the output pixel includes a non-keyed video parameter.

11. The system according to claim 9, wherein the substitute value selector is configured to generate the substitute pixel based on a determined nearest non-keyed pixel.

12. The system according to claim 9, wherein the substitute value selector is configured to generate the substitute pixel based on a non-keyed edge pixel.

13. The system according to claim 9, wherein the filter comprises a video scaler.

14. The system of claim 13, wherein the filter is configured to preform luma based filtering.

15. The system of claim 13, wherein the filter is configured to perform chroma based filtering.

16. The system of claim 9, further including a multiplexer controller to determine whether the input pixel is within the keying range.

17. A method, comprising:
in a video processing device that is operable to process video, determining whether an input pixel includes a keyed video parameter;
generating, at a substitute value selector, a substitute pixel; and
sending, via a filter, the input pixel if the input pixel does not include the keyed video parameter, and sending the substitute pixel if the input pixel does include the keyed video parameter.

18. The method of claim 17, wherein the filter comprises a video scaler.

19. The method of claim 17, wherein the substitute pixel comprises a visible pixel nearest to the input pixel.

* * * * *